(No Model.)

J. A. JOHNSON.
LAND ROLLER.

No. 288,061. Patented Nov. 6, 1883.

WITNESSES:
Fred. G. Dieterich.
J. Fred. Reily.

INVENTOR.
James A. Johnson
By Louis Bagger & Co.
ATTORNEYS.

United States Patent Office.

JAMES A. JOHNSON, OF CHARLESTOWN, INDIANA.

LAND-ROLLER.

SPECIFICATION forming part of Letters Patent No. 288,061, dated November 6, 1883.

Application filed July 27, 1883. (No model.)

*To all whom it may concern:*

Be it known that I, JAMES A. JOHNSON, a citizen of the United States, and a resident of Charlestown, in the county of Clark and State of Indiana, have invented certain new and useful Improvements in Land-Rollers; and I do hereby declare that the following is a full, clear, and exact description of the invention, which will enable others skilled in the art to which it appertains to make and use the same, reference being had to the accompanying drawings, which form a part of this specification, and in which—

Figure 1:
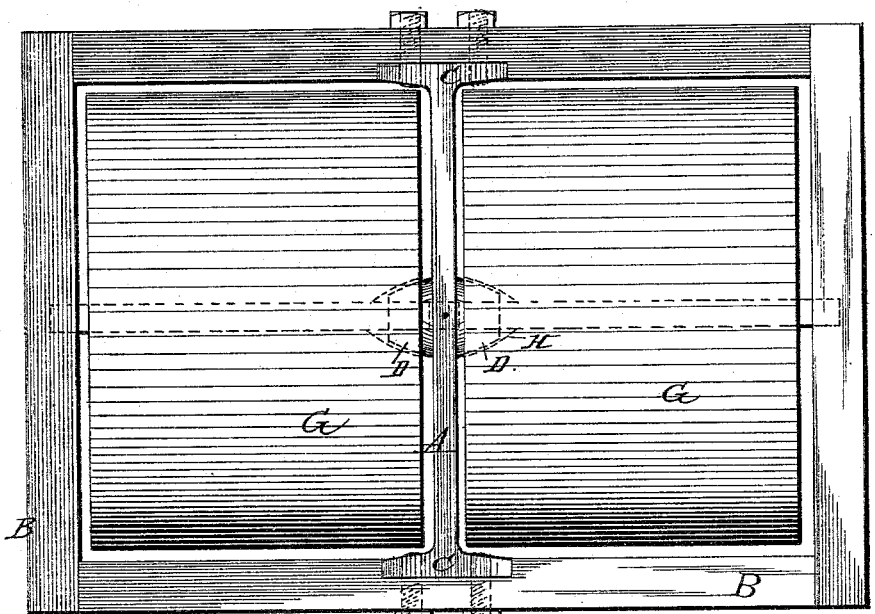
Figure 2:
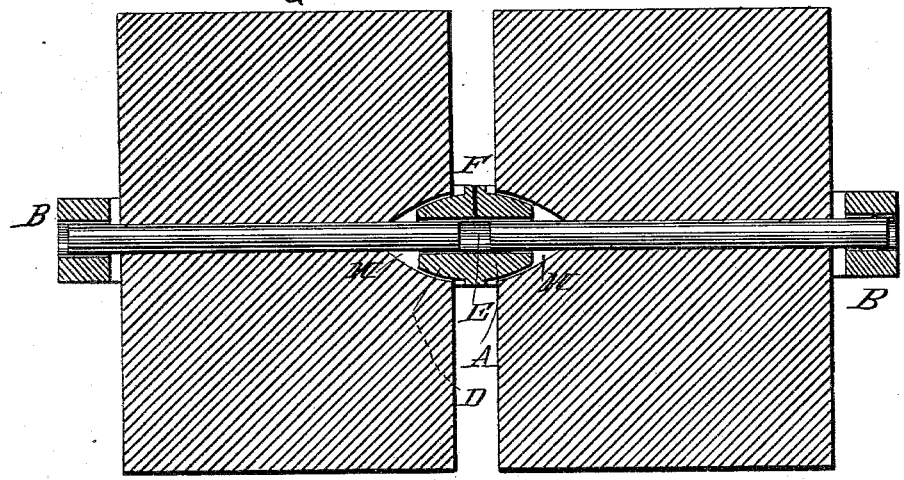
Figure 3:
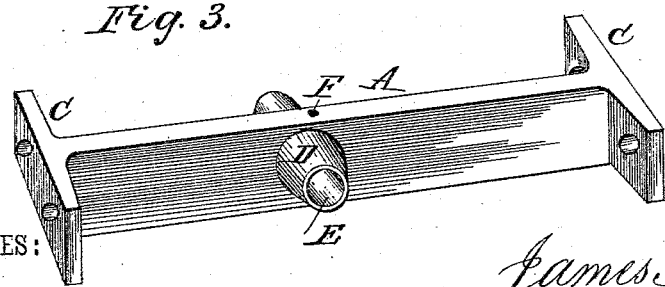

Figure 1 is a top view of my improved land-roller. Fig. 2 is a longitudinal vertical sectional view of the same, and Fig. 3 is a perspective detail view of the separating or division bar.

Similar letters of reference indicate corresponding parts in all the figures.

My invention has relation to improvements in land-rollers; and it consists in the improved construction and combination of parts of the same, as will be hereinafter more fully described and claimed.

In the accompanying drawings, A represents the division-bar, which extends across and divides the frame B into two compartments, the cross-heads upon the ends of said bar fitting into recesses on the inner sides of the end pieces of the frame B. The division-bar A is cast with the cross-heads C upon either end, and with central conical bearings, D, one upon either side, an opening, E, being pierced through the said bearings for the reception of the ends of the roller-axles. A vertical aperture, F, is made through the upper edge of the division-bar between the conical bearings, D, through which oil may be introduced for the lubrication of the inner ends of the roller-axles.

G represents one of the rollers of my improved machine, the outer end of the axle of which fits into an aperture in one of the side pieces of the roller-frame, the inner end of its axle fitting into the opening E, pierced through the conical bearings D, the inner face of the roller immediately around the inner end of its axle being recessed conically to adapt it to fit closely around the conical bearing D. The other roller is constructed in the same manner.

From the foregoing description, taken in connection with the accompanying drawings, the construction of my improved land-roller will readily be understood without requiring further explanation.

By constructing the division-bar A with the conical bearings D and apertures E, and the rollers G with the conical recesses H, immediately surrounding the inner ends of their axles, the inner end of each roller is not only provided with a double bearing, one end of its axle being supported in the aperture E, while the cone-shaped bearing D, fitting within the conical recess H, serves as an additional support, but the conical apertured bearings D also serve as compensating-journals to take up wear, as will readily be understood by reference to the drawings.

Having thus described my invention, I claim and desire to secure by Letters Patent of the United States—

1. A division-bar for land-rollers, having a cross-head at either end, and provided with central conical apertured bearings designed to act as compensating-journals, as set forth.

2. The combination of the frame B, division-bar A, having cross-heads C, conical bearings D, central bearing-aperture, E, and lubricating-aperture F, and rollers G G, having a conical recess surrounding the inner ends of their axles, in which the conical bearings D are adapted to fit, all constructed and combined as and for the purpose shown and described.

In testimony that I claim the foregoing as my own I have hereunto affixed my signature in presence of two witnesses.

JAMES A. JOHNSON.

Witnesses:
JOHN P. CARR,
JOHN D. SHARP.